US006760524B2

(12) United States Patent
Mukai

(10) Patent No.: US 6,760,524 B2
(45) Date of Patent: Jul. 6, 2004

(54) OPTICAL SIGNAL PROCESSING DEVICE, OPTICAL DEMULTIPLEXER, WAVELENGTH CONVERTING DEVICE, OPTICAL SIGNAL PROCESSING METHOD, AND WAVELENGTH CONVERTING METHOD

(75) Inventor: Kohki Mukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 10/092,437

(22) Filed: Mar. 8, 2002

(65) Prior Publication Data

US 2003/0081919 A1 May 1, 2003

(30) Foreign Application Priority Data

Oct. 29, 2001 (JP) ........................................ 2001-331091

(51) Int. Cl.[7] ................................................ G02B 6/00
(52) U.S. Cl. ..................... 385/122; 385/31; 359/332; 398/75; 398/79; 398/98
(58) Field of Search ............................. 385/122, 31, 39; 359/332; 398/74, 75, 79, 98

(56) References Cited

U.S. PATENT DOCUMENTS

| | | | | |
|---|---|---|---|---|
| 4,881,788 A | * | 11/1989 | Doran ........................ 385/16 |
| 5,493,433 A | * | 2/1996 | Prucnal et al. ................ 398/98 |
| 5,604,618 A | * | 2/1997 | Mori et al. .................. 398/150 |
| 5,825,519 A | * | 10/1998 | Prucnal ....................... 398/98 |
| 6,337,762 B1 | * | 1/2002 | Ueno ......................... 359/332 |
| 6,535,662 B2 | * | 3/2003 | Prucnal et al. ................ 385/16 |
| 2002/0126946 A1 | * | 9/2002 | Prucnal et al. ................ 385/16 |

* cited by examiner

Primary Examiner—Akm Enayet Ullah
Assistant Examiner—Sung Pak
(74) Attorney, Agent, or Firm—Armstrong, Kratz, Quintos, Hanson & Brooks, LLP

(57) ABSTRACT

An optical-path-superposing-and-separating unit superposes optical paths of two inputted signal lights with each other, and then separate them. A non-linear waveguide is arranged in an area where the optical paths are superposed with each other. First and second optical waveguide are connected to the optical path superposing-and-separating unit. The second optical waveguide has a longer optical path than the first optical waveguide. A control light is introduced to the non-linear waveguide. An interference separator distributes the inputted two signal lights depending on a phase difference therebetween. Third and fourth optical waveguides connect the optical-path-superposing-and-separating unit to the interference separator. Optical path lengths of the third and fourth optical waveguides are set such that a delay time of the signal light propagating through the second optical waveguide relative to the signal light propagating through the first optical waveguide is canceled at time when the two signal lights reach the interference separator.

29 Claims, 9 Drawing Sheets

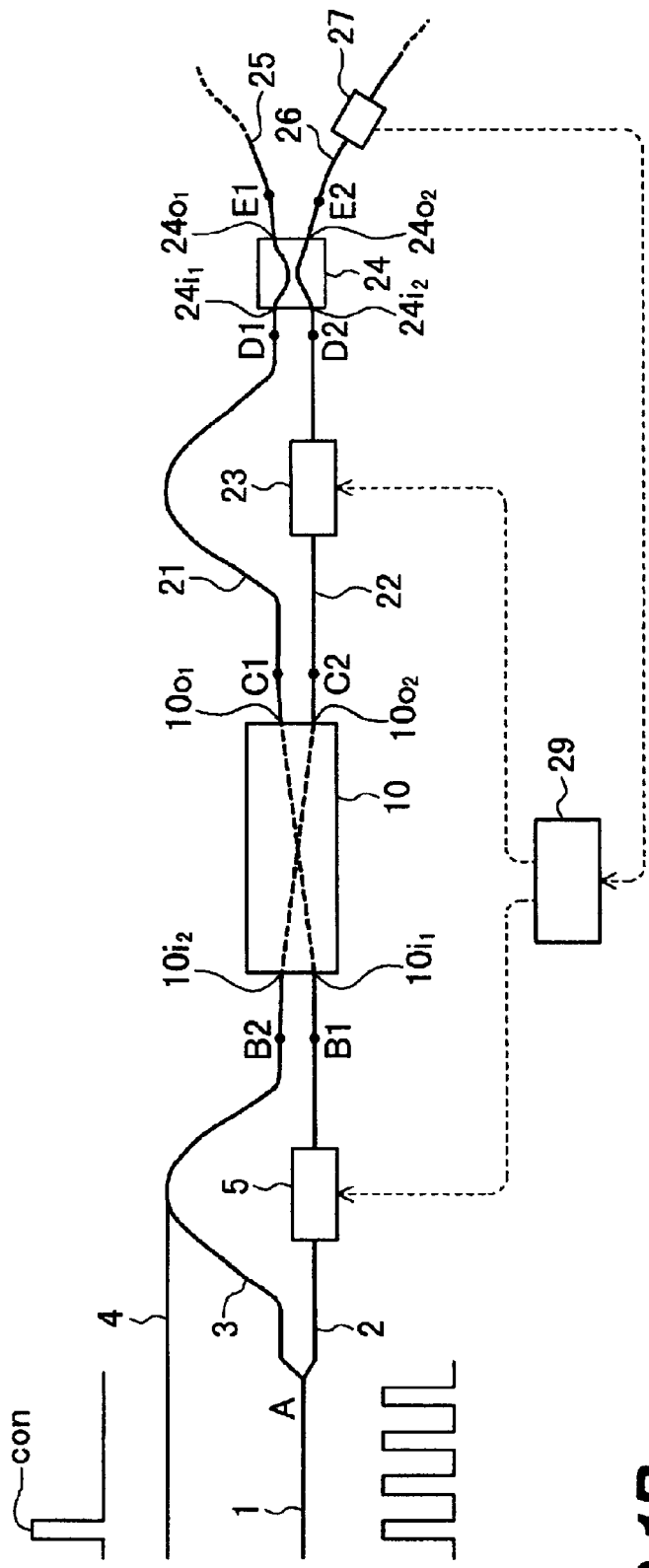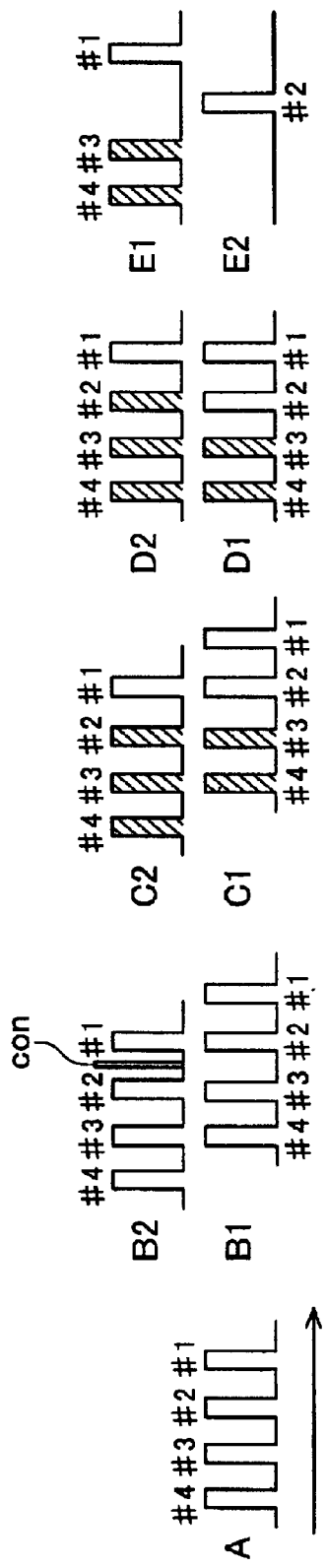
FIG.1A
FIG.1B

OPTICAL SIGNAL PROCESSING DEVICE, OPTICAL DEMULTIPLEXER, WAVELENGTH CONVERTING DEVICE, OPTICAL SIGNAL PROCESSING METHOD, AND WAVELENGTH CONVERTING METHOD

CROSS REFERENCE TO RELATED APPLICATION

This invention is based on and claims priority of Japanese patent application 2001-331091, filed on Oct. 29, 2001, the whole contents of which are incorporated herein by reference.

BACKGROUND OF THE INVENTION

1. Field of the Invention

The present invention relates to an optical signal processing device for carrying out signal processing without converting an optical signal into an electrical signal, an optical demultiplexer, a wavelength converting device, an optical signal processing method, and a wavelength converting method.

2. Description of the Related Art

Recently, a wavelength division multiplexing (WDM) optical communication system has been developed as a broadband optical communication system. Other optical communication systems, such as optical time division multiplexing (OTDM) and time wavelength division multiplexing (TWDM), have also been proposed and studied aiming at broader band optical communication.

In the WDM optical communication system, a plurality of wavelengths of wavelength multiplexed optical signals are assigned to communication channels in a one-to-one relation. For multiplexing a plurality of optical signals, each of original optical signals to be multiplexed must be converted to have the wavelength of a communication channel to which the optical signal is assigned. Hitherto, such wavelength conversion has been performed by first converting the optical into an electrical signal and then converting the electrical signal into an optical signal of a desired wavelength.

In the OTDM optical communication system, signal density is increased by employing optical pulses having the same wavelength and having a very narrow pulse width. Communication rate of a time-division multiplexed optical signal is, for example, 160 Gbits/s or higher.

Response speed of an electrical signal is limited by a moving time of carriers in a semiconductor device and hence lower than the response speed of an optical signal. At present, the speed limit of an electrical signal is thought to be about 40 Gbits/s. To process an OTDM signal having speed higher than that limit, an optical signal must be divided through high-speed optical signal processing and demultiplexed to a bit rate, at which electrical processing is feasible.

The TWDM optical communication system as a combination of the OTDM optical communication system and the WDM optical communication system is able to realize broader band optical communication.

In view of the above-mentioned background, an optical device (optical demultiplexer) has recently been studied which is able to demultiplex an optical signal, as it is, without converting the optical signal into an electrical signal. Hitherto, optical demultiplexers of, e.g., non-linear optical loop mirror (NOLM) type, Mach-Zehnder type and polarization separating type, have been proposed.

FIG. 9A is a schematic view of a NOLM type optical demultiplexer. An optical signal $sig_1$ reaches a branch point 102 of an optical fiber loop 101 via an input side optical fiber 100. At the branch point 102, the optical signal $sig_1$ is branched into an optical signal $sig_2$ propagating in the loop 101 counterclockwise and an optical signal $sig_3$ propagating in the loop 101 clockwise. The optical signal $sig_1$ is a signal having four time-division multiplexed channels, i.e., channels #1 to #4.

A non-linear waveguide 103 is inserted in the optical loop 101 at a position asymmetrical to the branch point 102. The optical signal $sig_2$ propagating counterclockwise reaches the non-linear waveguide 103 at timing earlier than the optical signal $sig_3$ propagating clockwise. A control light pulse con is inputted to the non-linear waveguide 103 immediately after the channel #2 of the optical signal $sig_2$ has passed the non-linear waveguide 103. The refractive index of the non-linear waveguide 103 is changed upon the inputting of the control light pulse con, whereby the phase of a pulse light in each channel #3 and #4 of the optical signal $sig_2$ is shifted $\pi$. In FIG. 9A, a pulse having phase shifted $\pi$ is represented by hatching.

Because the optical signal $sig_3$ reaches the non-linear waveguide 103 at timing delayed from the optical signal $sig_2$, only the channel #1 of the optical signal $sig_3$ has passed the non-linear waveguide 103 at the time when the control light pulse con is inputted to the non-linear waveguide 103. Therefore, the phase of a pulse light in each of the channels #2 to #4 of the optical signal $sig_3$ is shifted $\pi$.

When the optical signals $sig_2$ and $sig_3$ return to the branch point 102, the pulses in those ones #1, #3 and #4 of the channels of both the signals, which are in phase, propagate in the input side optical fiber 100, and the pulse in the out-of-phase channel #2 propagates in an output side optical fiber 105. Thus, only the signal of one channel can be separated from the time division multiplexed signal $sig_1$.

In the NOLM type optical demultiplexer, the time required for the optical signal to pass the optical loop 101 limits the signal speed achievable in signal processing. Also, the use of an optical fiber loop raises a difficulty in reducing the device size.

FIG. 9B is a schematic view of a Mach-Zehnder type optical demultiplexer. Non-linear waveguides 121 and 122 are inserted respectively in two arms of a Mach-Zehnder interferometer 120. An optical signal $sig_{10}$ is branched into two optical signals $sig_{11}$ and $sig_{12}$, which are introduced to the non-linear waveguides 121 and 122, respectively. A control light pulse con is inputted to the non-linear waveguides 121 and 122 at different timings from each other.

The control light pulse con is inputted to the non-linear waveguide 121 immediately after a pulse in a channel #1 has passed the non-linear waveguide 121, and is inputted to the non-linear waveguide 122 immediately after a pulse in a channel #2 has passed the non-linear waveguide 122. Therefore, the phase of an optical pulse in each of the channels #2 to #4 of the optical signal $sig_{11}$ is shifted $\pi$ after passing the non-linear waveguide 121, and the phase of an optical pulse in each channel #3 and #4 of the optical signal $sig_{12}$ is shifted $\pi$ after passing the non-linear waveguide 122.

When the optical signals $sig_{11}$ and $sig_{12}$ are combined with each other, the signals in the channels #1, #3 and #4 are introduced to one output optical fiber 125, and the signal in the channel #2 is introduced to the other output optical fiber 126.

Thus, in the Mach-Zehnder type optical demultiplexer, two arms, in which non-linear waveguides are respectively inserted, must be arranged parallel to each other. The device size is therefore increased.

FIG. 9C is a schematic view of a polarization separating type optical demultiplexer. An optical signal $sig_{20}$ enters a birefringence crystal 130. The birefringence crystal 130 delays a light in the TM mode by one pulse relative to a light in the TE mode. An optical signal $sig_{21}$ having passed the birefringence crystal 130 and a control light pulse con are both inputted to a non-linear waveguide 131. The control light pulse con is inputted to the non-linear waveguide 131 immediately after a TE-mode pulse in the channel #2 has passed the non-linear waveguide 131.

In an optical signal $sig_{22}$ having passed the non-linear waveguide 131, therefore, the phase of the TE-mode optical pulse in each channel #3 and #4 is shifted π, and the phase of the TM-mode optical pulse in each of the channels #2 to #4 is shifted π. The optical signal $sig_{22}$ having passed the non-linear waveguide 131 is inputted to another birefringence crystal 132. The birefringence crystal 132 delays a light in the TE mode by one pulse relative to a light in the TM mode. Accordingly, in an optical signal $sig_{23}$ having passed the birefringence crystal 132, positions of the TM-mode pulses match respectively with positions of the TE-mode pulses in the corresponding channels.

In the optical signal $sig_{23}$, therefore, the TM-mode pulses and the TE-mode pulses are in phase in the channels #1, #3 and #4, but they have a phase difference therebetween in the channel #2. By introducing the optical signal $sig_{23}$ to enter a polarizer 133, only the pulse of the chancel #2 can be separated.

Thus, the polarization separating type optical demultiplexer is designed on condition that an inputted optical signal has intensities substantially equal to each other between the TM and TE modes. In general, however, the polarization state of an optical signal having propagated through an optical fiber is not constant. For that reason, the polarization separating type optical demultiplexer is not suitable for practical use.

While the method of demultiplexing an optical signal has been described above, those three types of optical demultiplexers can also be employed to operate as a wavelength converter by using a signal light and a control light having different wavelengths from each other.

As described above, the various types of conventional optical demultiplexers have problems such as a limitation in processing speed, an increased device size, and dependency on the polarization state of an optical signal.

SUMMARY OF THE INVENTION

It is an object of the present invention to provide an optical signal processing device and method, which can increase the processing speed, can reduce the device size, and are free from dependency on the polarization state of an optical signal.

Another object of the present invention is to provide an optical demultiplexer using the optical signal processing device.

Still another object of the present invention is to provide a wavelength converting device and method, which can increase the processing speed, can reduce the device size, and are free from dependency on the polarization state of an optical signal.

According to one aspect of the present invention, there is provided an optical signal processing device comprising an optical path superposing and separating unit for receiving two signal lights, superposing once optical paths of the two inputted signal lights with each other, and then separating the two signal lights to be outputted separately, the optical path superposing and separating unit including a non-linear waveguide arranged in an area where both the optical paths are superposed with each other, the non-linear waveguide having a refractive index changed depending on externally applied excitation; a first optical waveguide having a signal light input end and an output end connected to the optical path superposing and separating unit, the first optical waveguide introducing the signal light to the optical path superposing and separating unit; a second optical waveguide having a signal light input end and an output end connected to the optical path superposing and separating unit, the second optical waveguide introducing the signal light to the optical path superposing and separating unit, the second optical waveguide having an optical path length from the input end thereof to the optical path superposing and separating unit, which is longer than an optical path length of the first optical waveguide from the input end thereof to the optical path superposing and separating unit; a control-light introducing optical system for introducing a control light to the non-linear waveguide; an interference separator for receiving the two signal lights and distributing the inputted signal lights depending on a phase difference between the two signal lights; a third optical waveguide for connecting the optical path superposing and separating unit to the interference separator, and introducing one of the signal lights outputted from the optical path superposing and separating unit to the interference separator; and a fourth optical waveguide for connecting the optical path superposing and separating unit to the interference separator, and introducing the other signal light outputted from the optical path superposing and separating unit to the interference separator, the fourth optical waveguide having a shorter optical path length than the third optical waveguide, the optical path length of the fourth optical waveguide being set such that a delay time of the signal light propagating through the second optical waveguide relative to the signal light propagating through the first optical waveguide is canceled at time when the two signal lights reach the interference separator.

The signal light inputted to the optical path superposing and separating unit after passing the second optical waveguide is delayed from the signal light inputted to the optical path superposing and separating unit after passing the first optical waveguide. The phase of the signal light passing the non-linear waveguide after the time, at which the control light is introduced to the non-linear waveguide, is changed. The phase of that signal light is delayed, e.g., π. At the time when the two signal lights reach the interference separator, the delay between both the signal lights is canceled. In a certain period of time, therefore, the phase of one signal light differs from that of the other. The interference separator separates a portion of the signal lights in which they are out of phase.

According to another aspect of the present invention, there is provided a wavelength converting device comprising an optical path superposing and separating unit for receiving two continuous lights having a first wavelength, superposing once optical paths of the two inputted continuous lights with each other, and then separating the two signal lights to be outputted separately, the optical path superposing and separating unit including a non-linear waveguide arranged in an area where both the optical paths are superposed with each other, the non-linear waveguide having a refractive index non-linearly changed upon a control light pulse having a second wavelength being introduced; a first optical waveguide having a continuous light input end and an output end connected to the optical path superposing and separating unit, the first optical waveguide introducing the continuous light to the optical path superposing and separating unit; a second optical waveguide having a continuous light input end and an output end connected to the optical path superposing and separating unit, the second optical waveguide introducing the continuous light to the optical path superposing and separating unit; a control-light introducing optical system for introducing a control light pulse to the non-linear waveguide; an interference separator for receiving the two continuous lights and outputting the light having the first wavelength only during a period in which a phase difference between the inputted two continuous lights satisfies a certain condition; a third optical waveguide for connecting the optical path superposing and separating unit to the interference separator, and introducing one of the continuous lights outputted from the optical path superposing and separating unit to the interference separator; and a fourth optical waveguide for connecting the optical path superposing and separating unit to the interference separator, and introducing the other continuous light outputted from the optical path superposing and separating unit to the interference separator, the fourth optical waveguide having a shorter optical path length than the third optical waveguide.

The phase of the continuous light passing the non-linear waveguide after the time, at which the control light is introduced to the non-linear waveguide, is changed. The phase of that continuous light is delayed, e.g., π. At the time when the two continuous lights reach the interference separator, one continuous light is delayed from the other. In a certain period of time, therefore, the phase of one continuous light differs from that of the other. The interference separator separates a portion of the continuous lights in which they are out of phase. A separated optical signal is in sync with the control signal. In other words, the wavelength of the control signal is converted into that of the continuous light.

According to still another aspect of the present invention, there is provided an optical demultiplexer comprising a plurality of drop devices, each of the drop devices having a control light input port to which a control light is applied, a signal light input port to which a signal light is applied, and a drop signal output port; a signal waveguide for branching a time-division multiplexed signal light and applying a plurality of branched signal lights respectively to the signal light input ports of the drop devices; and a control waveguide for branching one control light and applying a plurality of branched control lights to reach the corresponding drop devices at delays gradually shifted in units of a certain time, each of the drop devices having the same construction as the optical signal processing device set forth above.

According to still another aspect of the present invention, there is provided an optical demultiplexer comprising a number N (N is two or larger integer) of drop devices, each of the drop devices having a control light input port to which a control light is applied, a signal light input port to which a signal light is applied, and a drop signal output port; a signal waveguide for applying a signal light, which is time-division multiplexed at multiplicity of N and has a number N of channels, to the signal light input port of each of the drop devices; and a control waveguide for branching one control light into a number N of control lights and applying an i-th (i is an integer not smaller than 1 but not larger than N) one of the branched control lights to the control light input port of an i-th drop device, the signal waveguide and the control waveguide delaying one of the control light and the signal light relative to the other such that the control light applied to the i-th drop device is in sync with an i-th channel of the signal light applied to the i-th drop device, each of the drop devices having the same construction as the optical signal processing device set forth above.

According to still another aspect of the present invention, there is provided an optical demultiplexer comprising a number N (N is two or larger integer) of drop devices arranged from a first stage to an N-th stage, each of the drop devices having a control light input port to which a control light is applied, a signal light input port to which a signal light is applied, a drop signal output port from which the signal light is delivered in sync with inputting of the control light, and a through signal output port from which the signal light is delivered at least during a period in which the signal light is not delivered from the drop signal output port; a first signal waveguide for applying a time-division multiplexed signal light to the signal light input port of the first-stage drop device; a second signal waveguide for connecting the through signal output port of each drop device to the signal light input port of the drop device in a next stage; and a control waveguide for branching one control light and applying a plurality of branched control lights to reach the corresponding drop devices at delays gradually shifted in units of a certain time toward a most downstream stage, each of the drop devices having the same construction as the optical signal processing device set forth above.

According to still another aspect of the present invention, there is provided an optical signal processing method comprising the steps of branching a time-division multiplexed optical signal having a plurality of channels into a first optical signal and a second optical signal; introducing the first optical signal and the second optical signal to a non-linear waveguide such that the second optical signal is delayed a time corresponding to one channel from the first optical signal; changing a refractive index of the non-linear waveguide at first time, thereby changing phase of the optical signal in each channel passing the non-linear waveguide after the first time; introducing the first optical signal and the second optical signal, which are both outputted from the non-linear waveguide, to an interference separator such that the first optical signal is delayed a time corresponding to one channel from the second optical signal; and separating the optical signal in the channel, in which the first optical signal and the second optical signal are out of phase, among the corresponding channels of the first optical signal and the second optical signal.

According to still another aspect of the present invention, there is provided a wavelength converting method comprising the steps of branching a continuous light having a first wavelength into a first continuous light and a second continuous light; introducing the first continuous light and the second continuous light to a non-linear waveguide; changing a refractive index of the non-linear waveguide at first time by introducing, to the non-linear waveguide, a control light pulse having a second wavelength different from the first wavelength, thereby changing phases of the first continuous light and the second continuous light both passing the non-linear waveguide after the first time; introducing the first continuous light and the second continuous light, which are both outputted from the non-linear waveguide, to an interference separator such that the first continuous light is delayed a first delay time from the second continuous light;

and outputting an optical signal having the first wavelength only during a period in which the first continuous light and the second continuous light are out of phase.

With the features set forth above, only a signal light in a desired period of time can be extracted by superposing and then separating optical paths of two signal lights in a non-linear waveguide, and introducing the two signal lights to a separation interferometer, while one of the two signal lights is delayed from the other.

BRIEF DESCRIPTION OF THE DRAWINGS

FIG. 1A is a schematic view of an optical signal processing device according to a first embodiment of the present invention, and FIG. 1B shows signal waveforms for explaining the operation of the optical signal processing device;

DESCRIPTION OF THE PREFERRED EMBODIMENTS

Figure 2A:
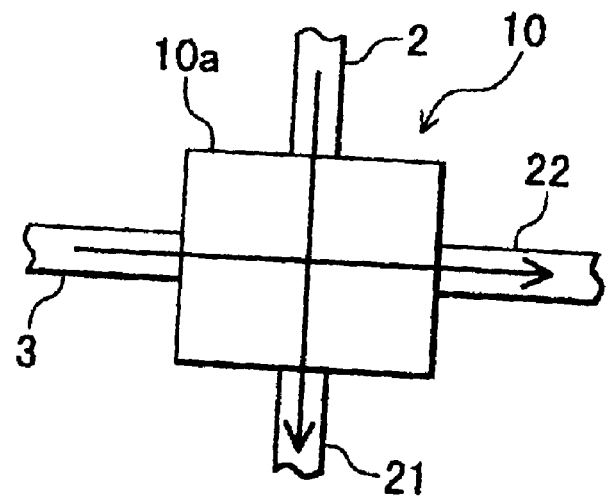
FIGS. 2A and 2B are schematic plan views respectively showing first and second examples of construction of an optical path superposing and separating unit, respectively, which is used in the optical signal processing device according to the first embodiment.

The construction, operation and principle of an optical signal processing device according to a first embodiment of the present invention will be described with reference to FIGS. 1A and 1B.

FIG. 1A is a schematic view of the optical signal processing device according to the first embodiment. An optical waveguide 1, to which a signal light having a wavelength $\lambda_1$ is applied, is branched at a branch point A into two optical waveguides 2 and 3. The optical waveguide 2 is connected to a first input point $10i_1$ of an optical path superposing and separating unit 10 via a phase adjuster 5. A point in the optical waveguide 2 just before the first input point $10i_1$ is defined as a passage point B1. An optical waveguide 4, to which a control light having a wavelength $\lambda_2$ is applied, merges with the optical waveguide 3. The optical waveguide 3 is connected to a second input point $10i_2$ of the optical path superposing and separating unit 10 after joining with the optical waveguide 4. A point in the optical waveguide 3 just before the second input point $10i_2$ is defined as a passage point B2.

The optical waveguide 3 has an optical path length longer than that of the optical waveguide 2. Therefore, the signal light propagating through the optical waveguide 3 reaches the optical path superposing and separating unit 10 at timing delayed from the signal light propagating through the optical waveguide 2.

The optical path superposing and separating unit 10 superposes once an optical path of the light applied through the first input point $10i_1$ and an optical path of the light applied through the second input point $10i_2$ with each other, and then separates both the optical paths again. The optical path superposing and separating unit 10 includes a non-linear waveguide arranged in an area where the two lights are superposed with each other. The light applied through the first input point $10i_1$ of the optical path superposing and separating unit 10 is delivered from a first output point $10o_1$ and the light applied through the second input point $10i_2$ thereof is delivered from a second output point $10o_2$. An optical waveguide 21 is connected at one end to the first output point $10o_1$. The optical waveguide 21 is connected at the other end to a first input point $24i_1$, of an interference separator 24. A point in the optical waveguide 21 just after the first output point $10o_1$ is defined as a passage point C1, and a point in the optical waveguide 21 just before the first input point $24i_1$ is defined as a passage point D1. An optical waveguide 22 is connected at one end to the second output point $10o_2$. The optical waveguide 22 is connected at the other end to a second input point $24i_2$ of the interference separator 24 via a phase adjuster 23. A point in the optical waveguide 22 just after the second output point $10o_2$ is defined as a passage point C2, and a point in the optical waveguide 22 just before the second input point $24i_2$ is defined as a passage point D2. Additionally, a directional coupler or a 2-input and 2-output multimode interferometer (MMI) can be used as the interference separator 24.

The optical waveguide 21 has an optical path length longer than that of the optical waveguide 22. The difference in optical path length between the optical waveguide 3 and the optical waveguide 2 is substantially equal to the difference in optical path length between the optical waveguide 21 and the optical waveguide 22. Therefore, the delay of the signal light occurred after propagating through the optical waveguide 3 is canceled at the time when the signal light enters the interference separator 24. In other words, the signal lights branched at the branch point A to the optical waveguides 2 and 3 reach the interference separator 24 substantially at the same time.

An optical waveguide 25 is connected to a first output point $24o_1$ of an interference separator 24, and an optical waveguide 26 is connected to a second output point $24o_2$. Points in the optical waveguides 25, 26 just after the first output point $24o_1$ and the second output point $24o_2$ are defined as passage points E1 and E2, respectively.

A photosensor 27 is inserted in the optical waveguide 26. The photosensor 27 measures the intensity of the signal light propagating through the optical waveguide 26, and transmits a measured result to a controller 29. In accordance with the measured result of the photosensor 27, the controller 29 controls the phase adjusters 5 and 23. Each of the phase adjusters 5 and 23 changes the delay time of the signal light propagating through the corresponding optical waveguide under control of the controller 29. The phase adjusters 5 and 23 are each constituted by, e.g., a semiconductor optical amplifier having the refractive index changed depending on an externally applied voltage.

FIG. 1B shows waveforms of the signal light at various points in the optical waveguides of the optical signal processing device shown in FIG. 1A. The signal light has a wavelength of, e.g., 1.55 $\mu$m. A symbol affixed to each waveform corresponds to the symbol representing the above-defined passage point in the optical waveguides shown in FIG. 1A. The signal light inputted to the optical waveguide 1 and reaching the branch point A comprises four signals, which are time-division multiplexed, and has four channels, i.e., communication channels #1 to #4. Note that the multiplicity of the signal light is not limited to 4, and switching is performed based on the similar operating principle even with the multiplicity set to a value other than 4.

The signal light reaching the passage point B2 has passed a longer optical path than the signal light reaching the passage point B1. The difference in the optical path exactly corresponds to the time difference of one channel. Therefore, the channel #1 of the signal light passing the passage point B2 enters the optical path superposing and separating unit 10 at the same time as the channel #2 of the signal light passing the passage point B1. Also, a control light pulse con is applied between the channels #1 and #2 of the signal light passing the passage point B2. The control light has a wavelength of, e.g., 1.3 $\mu$m or 1.48 $\mu$m.

The signal light applied through the first input point $10i_1$ and the signal light applied through the second input point $10i_2$ are superposed with each other in the non-linear waveguide inside the optical path superposing and separating unit 10. Upon the control light pulse being introduced to the non-linear waveguide, the refractive index of the non-linear waveguide is changed. A change in the refractive index is relaxed at a time constant much longer than the repetition cycle of pulses of the signal light. Accordingly, the phase of the signal light reaching the non-linear waveguide after the time, at which the control light pulse has been introduced to the non-linear waveguide, is changed about $\pi$.

In the optical path superposing and separating unit 10, the two signal lights are once superposed with each other and then separated such that the signal lights applied through the first input point $10i_1$ and the second input point $10i_2$ are delivered respectively from the first output point $10o_1$ and the second output point $10o_2$. Thus, the phase of a pulse in each channel #3 and #4 of the signal light passing the passage point C1 is changed. Also, the phase of a pulse in each of the channels #2 to #4 of the signal light passing the passage point C2 is changed. In FIG. 1B, the pulse having the changed phase is represented by hatching. At this point in time, the position of the pulse in the channel #2 of the signal light passing the passage point C1 is aligned on the time base with the position of the pulse in the channel #1 of the signal light passing the passage point C2.

The optical path length from the passage point C1 to D1 is longer than that from the passage point C2 to D2. The difference between both the optical path lengths corresponds to one channel. At the passage points D1 and D2, therefore, two pulses in the same channel of the signal lights passing those passage points are aligned with each other on the time base. Hence, the pulses in each of the channels #1, #3 and #4 have the same phase, whereas the pulses in the channel #2 have the opposite phases.

The interference separator 24 outputs the pulses having the same phase from the first output point $24o_1$ and the pulses having the opposite phases from the second output point $24o_2$. Therefore, the pulses in the channels #1, #3 and #4 are introduced to the optical waveguide 25, and only the pulse in the channel #2 is introduced to the optical waveguide 26. Thus, only the pulse in the channel #2 can be separated from the time-division multiplexed signals. By changing the time at which the control light pulse is applied, the signal in any desired channel can be separated.

The operation for outputting only the signal in the desired channel to the optical waveguide 26 is called a push operation, and the operation for outputting the signal in the next channel to the optical waveguide 25 is called a pull operation. In this embodiment described above, by applying the control light pulse for the push operation, the pull operation is also automatically performed without applying a pulse for the pull operation.

The intensity of the signal light propagating through the optical waveguide 26 is measured by the photosensor 27. In accordance with the measured result of the photosensor 27, the controller 29 controls the phase adjusters 5 and 23. If the delay time of the signal light propagating through the optical waveguide 3 relative to the signal light propagating through the optical waveguide 2 is deviated from a design value, the delay time can be adjusted by the phase adjuster 5 so as to become closer to the design value. The phase adjuster 23 also has the same function.

Furthermore, the efficiency of the optical signal processing device can be increased by controlling the phase adjusters 5 and 23 so that the intensity of the optical signal taken out into the optical waveguide 26 is maximized.

Practical examples of construction of the optical path superposing and separating unit 10 shown in FIG. 1A will be described below with reference to FIGS. 2A to 3C.

FIG. 2A is a schematic plan view showing a first example of construction of the optical path superposing and separating unit 10. A non-linear waveguide 10a having a square or rectangular shape in plan view is formed on a semiconductor substrate. The non-linear waveguide 10a is constituted by a semiconductor optical amplifier. The optical waveguide 2 is connected to one side of the non-linear waveguide 10a, and the optical waveguide 3 is connected to another side of the non-linear waveguide 10a adjacent to the one side. The optical waveguide 21 is connected to still another side of the non-linear waveguide 10a opposed to the side to which the optical waveguide 2 is connected, and the optical waveguide 22 is connected to still another side of the non-linear waveguide 10a opposed to the side to which the optical waveguide 3 is connected. The direction of propagation of light through each optical waveguide is perpendicular to the side to which the relevant optical waveguide is connected.

The optical path of the signal light having entered the non-linear waveguide 10a from the optical waveguide 2 crosses, in an orthogonal relation, the optical path of both the signal light and the control light having entered the non-linear waveguide 10a from the optical waveguide 3. Thereafter, the two signal lights and the control light advance straightforward. The signal light having entered the non-linear waveguide 10a from the optical waveguide 2 enters the optical waveguide 21, and both the signal light and the control light having entered the non-linear waveguide 10a from the optical waveguide 3 enters the optical waveguide 22. Thus, the two optical paths cross each other at 90°, and this construction is effective to prevent cross talk between the signal lights propagating through the two optical paths.

Upon the control light pulse being applied from the optical waveguide 3, the refractive index of a portion of the non-linear waveguide 10a, in which the two optical paths cross each other, is changed. Such a change in the refractive index affects the two signal lights having entered the non-linear waveguide 10a from the optical waveguides 2 and 3. Consequently, the phase of each signal light having passed the non-linear waveguide 10a after the inputting of the control light pulse is changed.

Figure 2B:
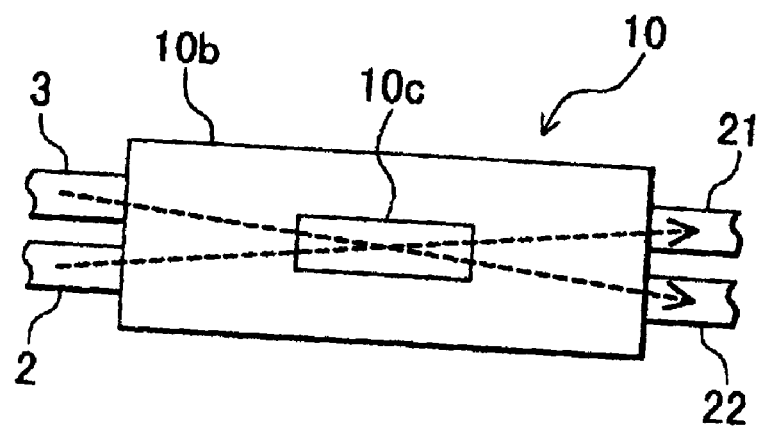

FIG. 2B is a schematic plan view showing a second example of construction of the optical path superposing and separating unit 10. A multimode interferometer 10b having a rectangular shape in plan view is formed on the surface of a semiconductor substrate. The optical waveguides 2 are 3 are both connected to one side of the multimode interferometer 10b, and the optical waveguides 21 and 22 are both connected to another opposite side of the multimode interferometer 10b.

The signal lights having entered the multimode interferometer 10b from the optical waveguides 2 and 3 propagate along respective two optical paths depending characteristics of the multimode interferometer 10b, and are then introduced to the optical waveguides 21 and 22. FIG. 2B shows the case in which the optical paths of the two signal lights are superposed with each other substantially at the center of the multimode interferometer 10b.

A non-linear waveguide 10c is arranged in an area of the multimode interferometer 10b where the optical paths of the two signal lights are superposed with each other. The non-linear waveguide 10c is constituted by, for example, a semiconductor optical amplifier. A control light having entered the multimode interferometer 10b from the optical waveguide 3 also passes the non-linear waveguide 10c. Upon the control light being introduced to the non-linear waveguide 10c, the refractive index of the non-linear waveguide 10c is changed, thereby affecting the two signal lights. Consequently, the phase of each signal light having passed the non-linear waveguide 10c after the inputting of the control light pulse is changed.

Figure 3A:
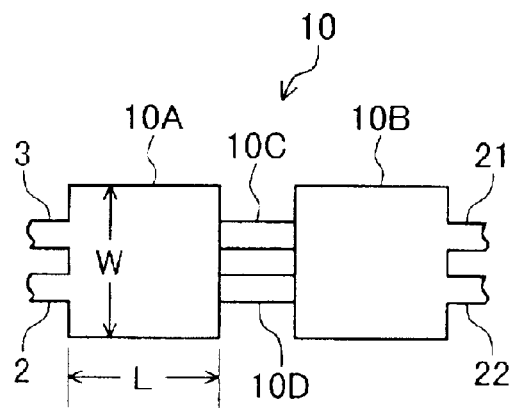
FIG. 3A is a schematic plan view showing a third example of construction of the optical path superposing and separating unit used in the optical signal processing device according to the first embodiment.

FIG. 3A is a schematic plan view showing a third example of construction of the optical path superposing and separating unit 10. The optical path superposing and separating unit 10 comprises a first-stage multimode interferometer 10A, a second-stage multimode interferometer 10B, and two non-linear waveguides 10C and 10D. The multimode interferometers 10A and 10B are each of a multilayered structure made up of a core layer having relative permitivity of 3.25 and clad layers having relative permitivity of 3.18 and sandwiching the core layer from above and below. The core layer has a rectangular shape elongate in the light incident direction with a width W of 15 $\mu$m and a length L of 320 $\mu$m.

Optical waveguides 2 and 3 are connected to one side of the first-stage multimode interferometer 10A on the input side. Optical waveguides 21 and 22 are connected to one side of the second-stage multimode interferometer 10B on the output side. The two non-linear waveguides 10C and 10D interconnect another side of the first-stage multimode interferometer 10A on the output side and another side of the second-stage multimode interferometer 10B on the input side. The non-linear waveguides 10C and 10D are each constituted by a semiconductor optical amplifier, and has a width of 2.5 $\mu$m and a length of 140 $\mu$m. The non-linear waveguides 10C and 10D may have a length larger than 140 $\mu$m for sufficient phase modulation of the passing light.

Figure 3B:
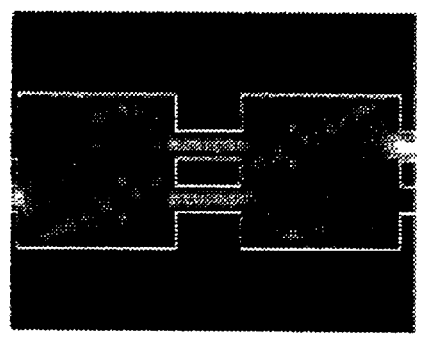
FIGS. 3B and 3C show propagation of light.
Figure 3C:
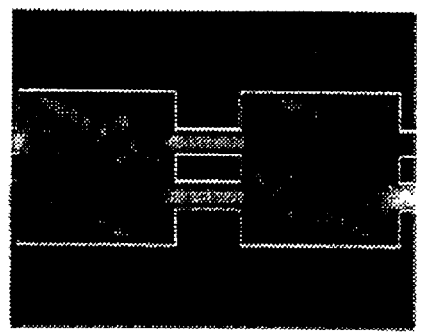

FIGS. 3B and 3C show results obtained by simulating propagation of signal lights passing the optical path superposing and separating unit 10 shown in FIG. 3A. In FIGS. 3A and 3B, a white area represents a portion in which the signal light has a high intensity. As shown in FIG. 3B, the signal light inputted from the optical waveguide 2 passes both the non-linear waveguides 10C and 10D, and then outgoes into only the optical waveguide 21. As shown in FIG. 3C, the signal light inputted from the optical waveguide 3 passes both the non-linear waveguides 10C and 10D, and then outgoes into only the optical waveguide 22. Thus, the optical paths of the two signal lights are once superposed with each other in the non-linear waveguides 10C and 10D. Thereafter, the two optical paths are separated again so that each signal light outgoes into only the corresponding one of the optical waveguides on the output side.

A control light inputted from the optical waveguide 3 also passes both the non-linear waveguides 10C and 10D. Upon the inputting of the control light, the refractive indexes of the non-linear waveguides 10C and 10D are changed, thereby affecting the two signal lights inputted from the optical waveguides 2 and 3.

Additionally, at least two waveguides are not required to interconnect the first-stage multimode interferometer 10A and the second-stage multimode interferometer 10B. Of those waveguides, at least one is required to be a nonlinear waveguide.

Figure 4:
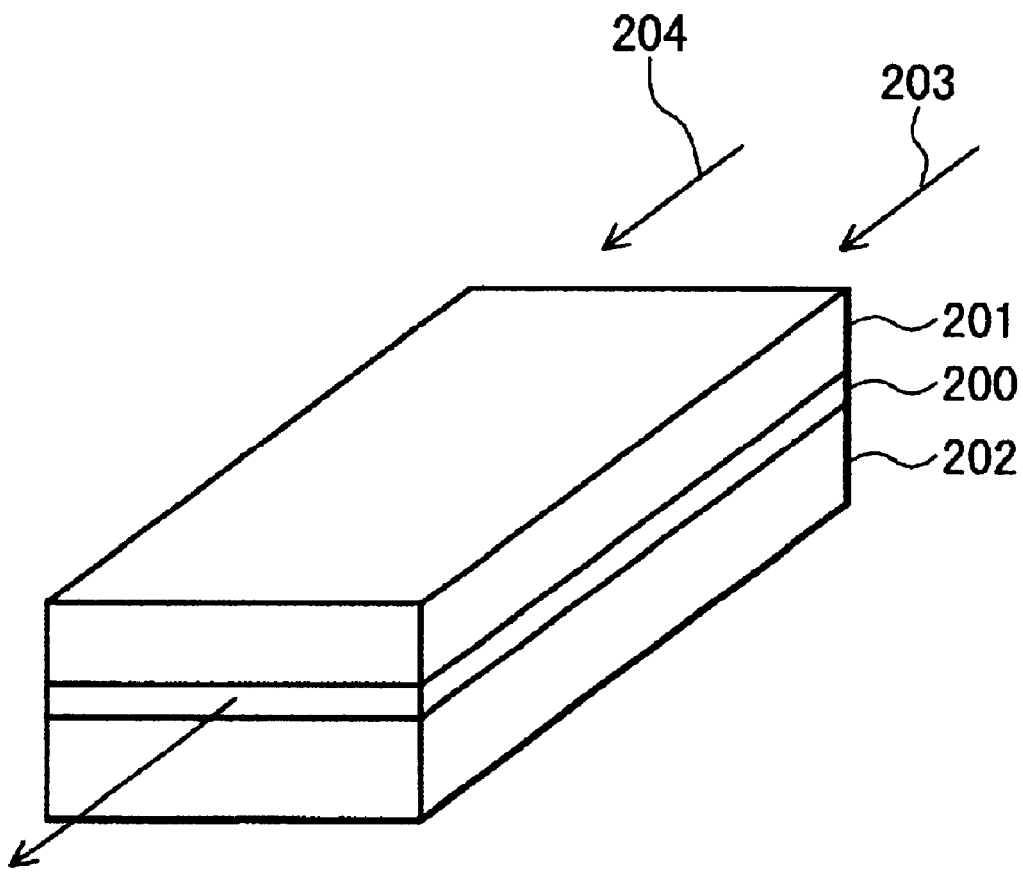
FIG. 4 is a perspective view of a non-linear waveguide (semiconductor optical amplifier) used in the optical path superposing and separating unit of the optical signal processing device.

FIG. 4 is a schematic perspective view of a semiconductor optical amplifier used in the above-described examples of the optical path superposing and separating unit 10. The semiconductor optical amplifier has a structure in which an active layer 200 having a gain for amplification of light is sandwiched by a p-type semiconductor layer 201 and an n-type semiconductor layer 202. The active layer 200 is formed as a quantum well layer or a semiconductor layer made of a semiconductor material having a smaller band gap than those of the semiconductor layers 201 and 202 on both sides. For example, the active layer 200 is made of InGaAsP, and the semiconductor layers 201 and 202 on both sides are made of InP. The semiconductor optical amplifier can be formed on the same semiconductor substrate on which the multimode interferometers 10A, 10B and the optical waveguides 2, 3, 21 and 22, shown in FIG. 3A, are formed.

Upon a control light 204 being applied to the active layer 200, a carrier distribution in the active layer 200 is brought into an inverted population state and the refractive index of the active layer 200 is changed. When an optical signal 203 enters the active layer 200 through one end surface thereof in such a state, the optical signal is subjected to phase modulation and then exits from the other end surface on the opposite side. Thus, the refractive index of a non-linear waveguide can be changed by applying the control light to the non-linear waveguide constituted by the semiconductor optical amplifier.

An optical signal processing device according to a second embodiment of the present invention will be described below with reference to FIGS. 5A and 5B. In the optical signal processing device according to the second embodiment, multimode interferometers are used to implement all of the combining and separating steps in the optical signal processing device according to the first embodiment shown in FIG. 1A.

Figure 5A:
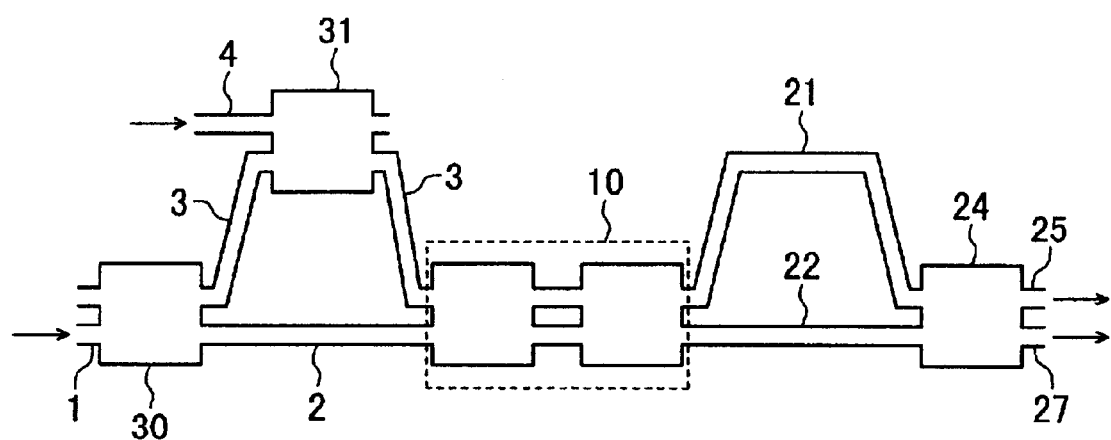
FIG. 5A is a schematic plan view of an optical signal processing device according to a second embodiment of the present invention.

FIG. 5A is a schematic plan view of the optical signal processing device according to the second embodiment. Each optical waveguide in FIG. 5A is denoted by the same reference numeral as that used to denote the corresponding optical waveguide in the optical signal processing device shown in FIG. 1A. An optical waveguide 1 is connected to an input point of a branching multimode interferometer 30, and optical waveguides 2 and 3 are connected respectively to two output points thereof. A signal light propagating through the optical waveguide 1 is branched by the branching multimode interferometer 30 into two signal lights, which are then introduced to the optical waveguides 2 and 3 with intensities almost equal to each other.

A combining multimode interferometer 31 is inserted midway the optical waveguide 3. The optical waveguide 3 is connected to one of two input points and an output point of the combining multimode interferometer 31. An optical waveguide 4 is connected to the other input point of the combining multimode interferometer 31. A signal light entering the combining multimode interferometer 31 from the optical waveguide 3 and a control light entering the combining multimode interferometer 31 from the optical waveguide 4 are both delivered from the output point of the combining multimode interferometer 31 and then introduced to the optical waveguide 3.

The optical path superposing and separating unit 10 has the same construction as that of the third example shown in FIG. 3A. A 2-input and 2-output multimode interferometer 24 is used as the interference separator 24 shown in FIG. 1A.

In the optical signal processing device according to the second embodiment, all optical elements, such as the optical waveguides, multimode interferometers and the semiconductor optical amplifiers, can be formed on a single semiconductor substrate. The operating principle of the optical signal processing device according to the second embodiment is similar to that of the optical signal processing device according to the first embodiment shown in FIG. 1A, and hence a description of the operating principle is omitted here.

Figure 5B:
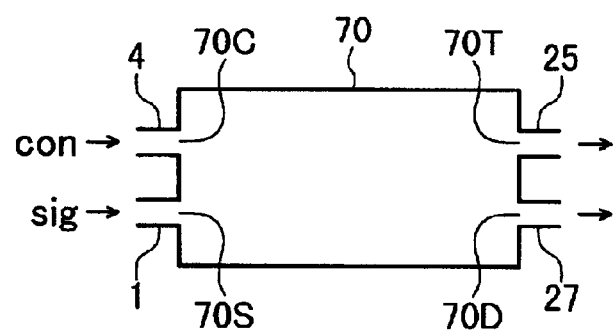
FIG. 5B is a block diagram of the optical signal processing device.

FIG. 5B is a block diagram of an optical signal processing device 70, in which an internal optical circuit of the optical signal processing device shown in FIG. 5A is represented as a black box. The optical signal processing device 70 has a control light input port 70C to which a control light pulse con is applied, a signal light input port 70S to which a signal light sig is applied, and two output ports 70T and 70D. The control light input port 70C corresponds to one of the input ports of the combining multimode interferometer 31 shown in FIG. 5A, to which the optical waveguide 4 is connected, and the signal light input port 70S corresponds to one of the input ports of the branching multimode interferometer 30 shown in FIG. 5A, to which the optical waveguide 1 is connected. Further, the output ports 70T and 70D correspond respectively to one of the output ports of the multimode interferometer 24 shown in FIG. 5A, to which the optical waveguide 25 is connected, and the other output port, to which the optical waveguide 27 is connected.

When the control light pulse con is applied through the control light input port 70C, the optical signal sig is delivered from the output port 70D for a certain period. The output port 70D is hence called a drop signal output port. Also, the other output port 70T is called a through signal output port. In this specification, the optical switch 70 is called a drop device.

Figure 6:
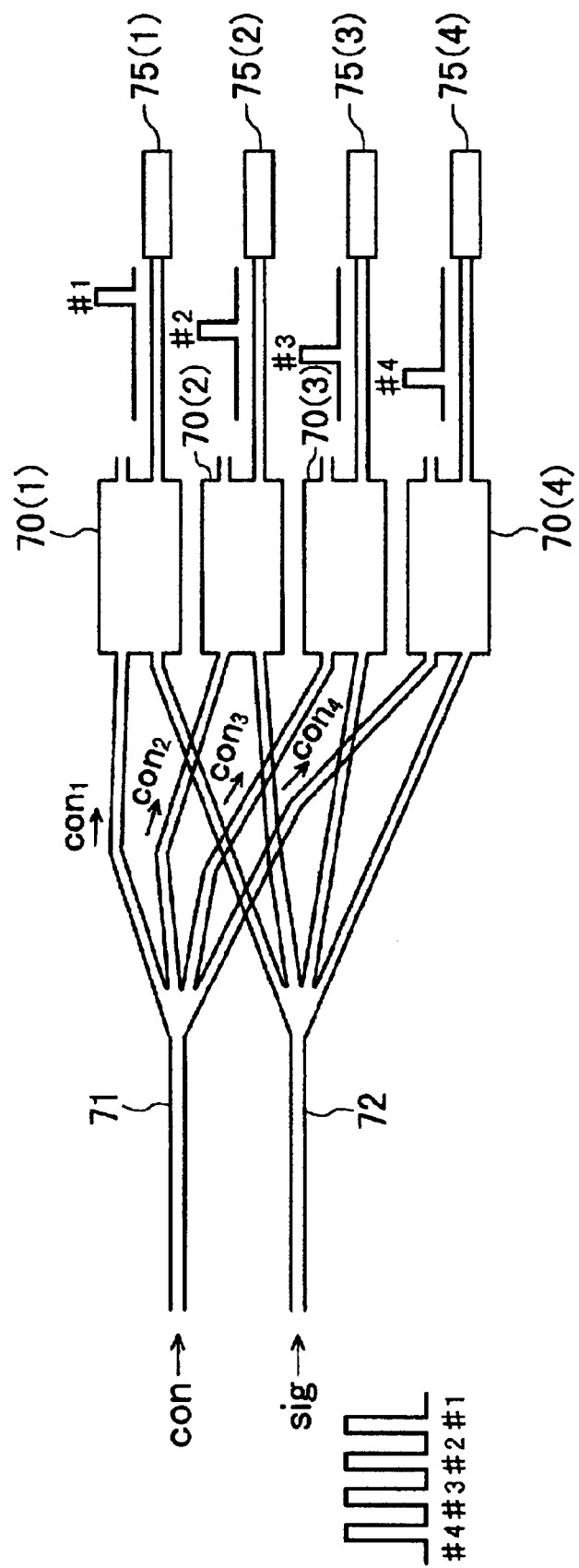
FIG. 6 is a schematic plan view of an optical demultiplexer according to a third embodiment of the present invention.

FIG. 6 is a schematic plan view of an optical demultiplexer according to a sixth embodiment of the present invention. The optical demultiplexer according to the sixth embodiment comprises four drop devices 70(1) to 70(4), four optoelectronic transducers 75(1) to 75(4), an optical signal waveguide 72, and a control light waveguide 71. Each of the drop devices 70(1) to 70(4) is the same as the drop device 70 according to the fifth embodiment shown in FIG. 5B.

An optical signal sig, which is time-division multiplexed at multiplicity of 4 and contains pulses of channels #1 to #4, is branched into four optical signals by the optical signal waveguide 72. The branched optical signals sig are introduced to respective optical signal input ports of the drop devices 70(1) to 70(4).

A control light pulse con is branched into four control light pulses $con_1$ to $con_4$ by the control light waveguide 71. The branched control light pulses $con_1$ to $con_4$ are applied to respective control light input ports of the drop devices 70(1) to 70(4). The four control light pulses $con_1$ to $con_4$ reach the corresponding drop devices 70(1) to 70(4) at delays gradually shifted in units of a certain time. More specifically, at the time when the pulse in the channel #i of the signal sig reaches the drop device 70(i), the control light pulse $con_i$ reaches the drop device 70(i). The pull control is thereby performed. Then, until arrival of the pulse in the channel #(i+1), the push control is completed.

Thus, only the pulse in the channel #i is delivered from a drop signal output port of the drop device 70(i). It is therefore possible to demultiplex the time-division multiplexed optical signal sig and to obtain individual signals in respective channels. From an optical signal of 160 Gbits/s, for example, four optical signals of 40 Gbits/s can be obtained. The optical signal in the channel #i is inputted to the optoelectronic transducer 75(i) for conversion into an electrical signal.

Figure 7:
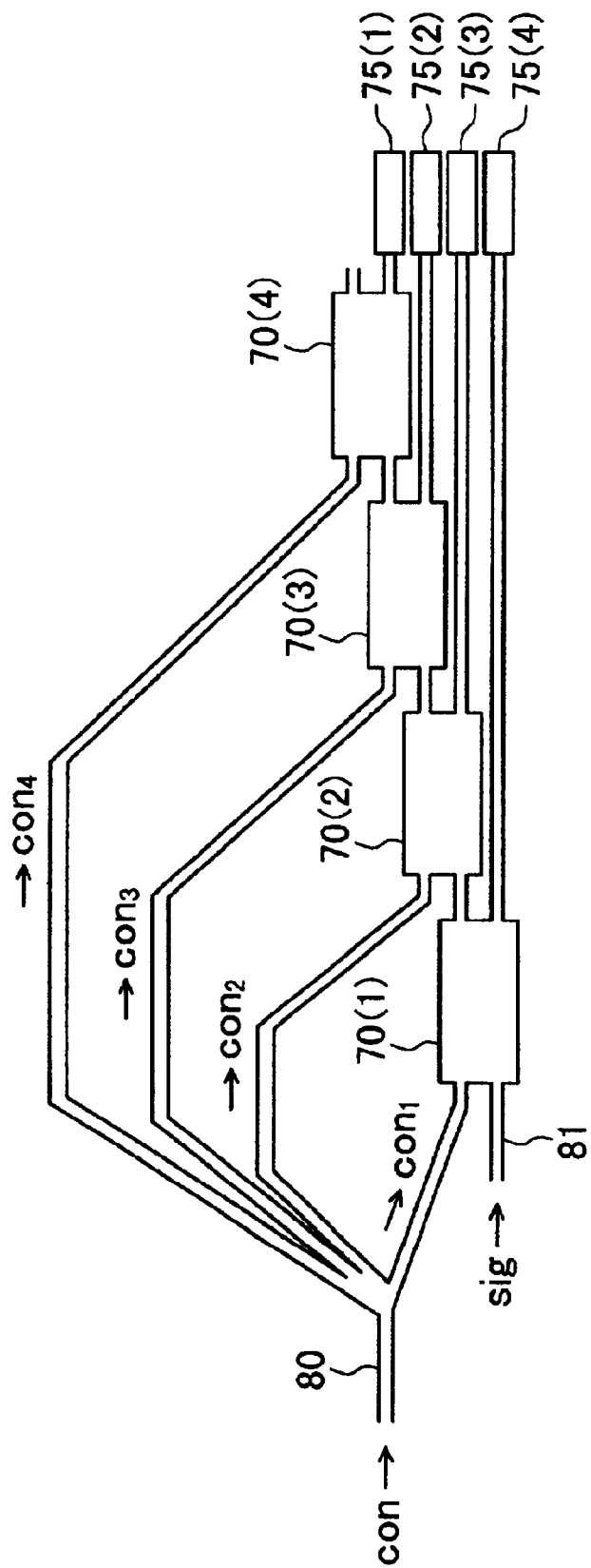
FIG. 7 is a schematic plan view of an optical demultiplexer according to a fourth embodiment of the present invention.

FIG. 7 is a schematic plan view of an optical demultiplexer according to a seventh embodiment of the present invention. While the four drop devices are connected in parallel in the optical demultiplexer of the sixth embodiment, the optical demultiplexer of the seventh embodiment comprises four drop devices 70(1) to 70(4) connected in series. Stated otherwise, a through signal output port of the drop device 70(i) is connected to an optical signal input port of the drop device 70(i+1) in the next stage. Optoelectronic transducers 75(1) to 75(4) are connected to respective drop signal output ports of the drop devices 70(1) to 70(4).

An optical signal sig, which is time-division multiplexed at multiplicity of 4, is introduced to the optical signal input port of the first-stage drop device 70(1). A control light pulse con is branched into four control light pulses $con_1$ to $con_4$. The branched control light pulses $con_1$ to $con_4$ are applied to respective control light input ports of the drop devices 70(1) to 70(4).

A control light waveguide 80 delays the control light pulses $con_1$ to $con_4$ by respective predetermined periods of time so that at the time when a pulse in the channel #i of the signal sig reaches the drop device 70(i), the control light pulse $con_i$ reaches the drop device 70(i). Upon the control light pulse $con_i$ reaching the drop device 70(i), the pull control is performed in the drop device 70(i). Then, until arrival of the pulse in the channel #(i+1), the push control is completed.

Thus, only the pulse in the channel #i is delivered from a drop signal output port of the drop device 70(i). It is therefore possible to demultiplex the time-division multiplexed optical signal sig and to obtain individual signals in respective channels. The optical signal in the channel #i is inputted to the optoelectronic transducer 75(i) for conversion into an electrical signal.

The sixth and seventh embodiments have been described in connection with the case of demultiplexing an optical signal multiplexed at multiplicity of 4. Generally, when demultiplexing an optical signal multiplexed at multiplicity of N, a number N of drop devices are connected in parallel or in series.

Also, in the sixth and seventh embodiments, one control light pulse is branched and a plurality of branched control light pulses are applied so as to reach the corresponding drop devices at delays gradually shifted in units of a certain time. Accordingly, there is no need of generating the control light pulse for each of the time-division multiplexed channels.

Advantages of the sixth and seventh embodiments will now be described while comparing both the embodiments with each other.

In the sixth embodiment, since the optical signal sig is evenly divided into four rays, the intensity of the optical signal sig inputted to each drop device 70(i) is about ¼ of the intensity of the original optical signal sig. In the seventh embodiment, however, since one ray of original optical signal sig passes the four drop devices 70(1) to 70(4) successively, the signal intensity is hardly reduced. As a result, in the seventh embodiment, the intensity of the optical signal in each separated channel can be maintained at a high level.

In the seventh embodiment, each time the optical signal sig passes the drop device 70(i), the signal purity is reduced. For example, the signal waveform is deformed, or noise is mixed, or jitter occurs. On the other hand, in the sixth embodiment, deterioration of the signal purity hardly occurs.

In the sixth embodiment, branches of the control light waveguide 71 cross branches of the optical signal waveguide 72. Therefore, due care is required in design of the waveguides.

The construction and the operating principle of a wavelength converting device according to a fifth embodiment of the present invention will be described with reference to FIGS. 8A and 8B.

Figure 8A:
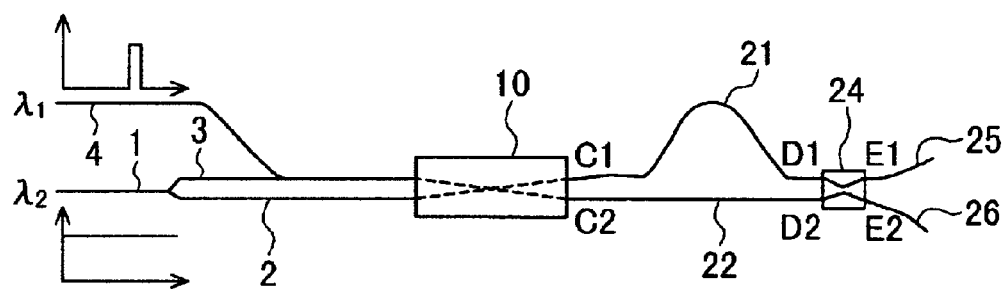
FIG. 8A is a schematic view of a wavelength converting device according to a fifth embodiment of the present invention.

FIG. 8A is a schematic view of the wavelength converting device according to the fifth embodiment. The wavelength converting device is of substantially the same construction as the optical signal processing device according to the first embodiment shown in FIG. 1A. Components of the optical signal processing device shown in FIG. 5A are denoted by the same reference numeral as those used to denote the corresponding components of that shown in FIG. 1A.

While the optical waveguides 2 and 3 have the optical path lengths different from each other in the first embodiment, there is no need of setting the difference in optical path length between both the optical waveguides in the fifth embodiment. The photosensor 27, the controller 29, and the phase adjusters 5 and 23 are not illustrated in FIG. 8A, but those components may also be arranged as with the first embodiment.

Figure 8B:
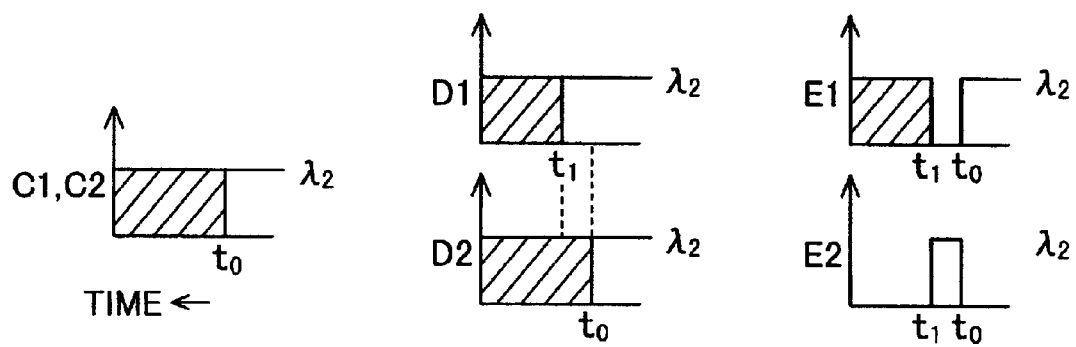
FIG. 8B shows signal waveforms for explaining the operation of the wavelength converting device.
Figure 9A:
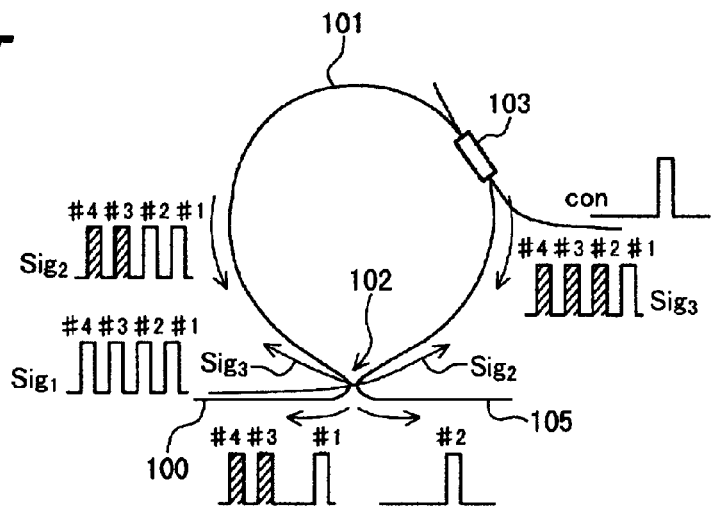
FIGS. 9A to 9C are schematic views of conventional optical demultiplexers.
Figure 9B:
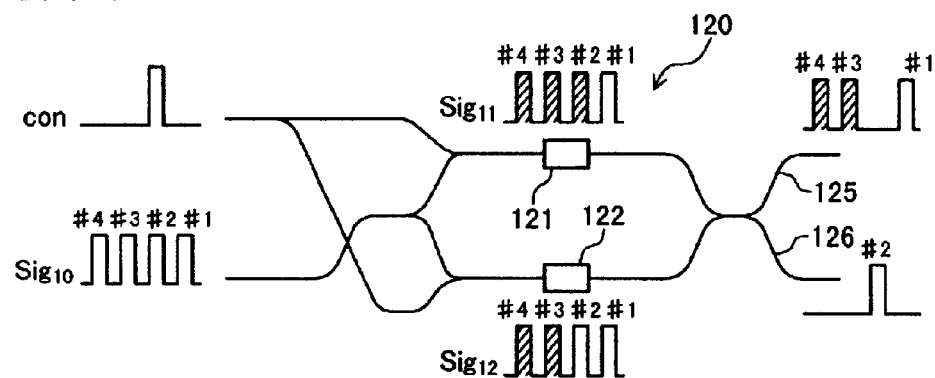
Figure 9C:
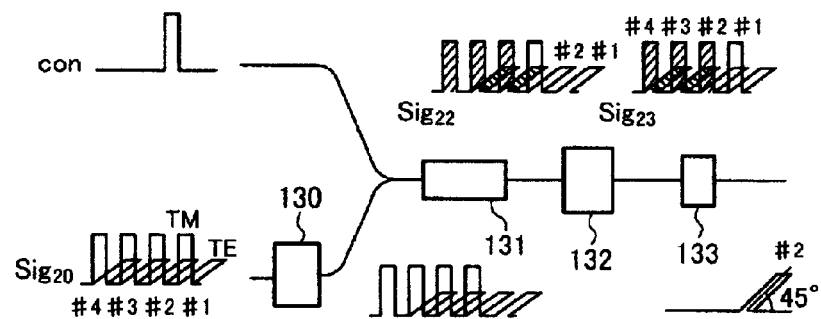

FIG. 8B shows waveforms of the signal light at various passage points in the wavelength converting device according to the fifth embodiment shown in FIG. 8A. A continuous light having a wavelength $\lambda_2$ is applied to an optical waveguide 1. A pulse light having a wavelength $\lambda_1$ is inputted to an optical waveguide 4. The inputting of the pulse light changes the phase of the continuous light passing the optical path superposing and separating unit 10 after time $t_0$, at which the pulse light enters the optical path superposing and separating unit 10. At passage points C1 and C2, therefore, the phase of each continuous light after the time $t_0$ is changed. A portion of the continuous light having the phase changed is represented by hatching.

The continuous light having passed an optical waveguide 21 is delayed from the continuous light having passed an optical waveguide 22. That delay time is expressed by $t_1-t_0$. At a passage point D2, the phase of the signal light after the time $t_0$ is changed. It is assumed herein that a time required for the signal light to propagate through the optical waveguide 22 is zero. At a passage point D1, the phase of the signal light after the time $t_1$ is changed.

An interference separator 24 outputs the signal light to an optical waveguide 25 during a period in which the two continuous light applied to the interference separator 24 are in phase, and outputs the signal light to an optical waveguide 26 during a period in which the two applied continuous light are out of phase. Therefore, the signal light having the wavelength $\lambda_2$ is applied to the optical waveguide 26 only during a period between the time $t_0$ and $t_1$. This means that the pulse light having the wavelength $\lambda_1$ is converted into the pulse light having the wavelength $\lambda_2$.

In any of the optical signal processing devices, the optical demultiplexers and the wavelength converting device according to the first to fifth embodiments, a plurality of optical elements can be of a monolithic structure formed on a single semiconductor substrate. The device size can be therefore reduced. However, the optical signal processing device and so on are not necessarily required to be in a monolithic structure, and an optical fiber or an optical crystal can also be used to form the waveguide. The non-linear optical waveguide may be made of a non-linear optical material such as $LiNbO_3$.

Further, since the operations of the optical signal processing devices, the optical demultiplexers and the wavelength converting device according to the first to fifth embodiments are not dependent on the polarization state of a signal light, the signal light having exited from an optical fiber can be processed in a desired manner.

The present invention has been described above in connection with the preferred embodiments, but the present invention is not limited to the illustrated embodiments. It is apparent to those skilled in the art that, for example, various modifications, improvements, and combinations thereof can be made on the present invention.

What is claimed is:

1. An optical signal processing device comprising:

an optical path superposing and separating unit for receiving two signal lights, superposing once optical paths of the two inputted signal lights with each other, and then separating the two signal lights to be outputted separately, the optical path superposing and separating unit including a non-linear waveguide arranged in an area where both the optical paths are superposed with each other, the non-linear waveguide having a refractive index changed depending on externally applied excitation;

a first optical waveguide having a signal light input end and an output end connected to the optical path superposing and separating unit, the first optical waveguide introducing the signal light to the optical path superposing and separating unit;

a second optical waveguide having a signal light input end and an output end connected to the optical path superposing and separating unit, the second optical waveguide introducing the signal light to the optical path superposing and separating unit, the second optical waveguide having an optical path length from the input end thereof to the optical path superposing and separating unit, which is longer than an optical path length of the first optical waveguide from the input end thereof to the optical path superposing and separating unit;

a control-light introducing optical system for introducing a control light to the non-linear waveguide;

an interference separator for receiving the two signal lights and distributing the inputted signal lights depending on a phase difference between the two signal lights;

a third optical waveguide for connecting the optical path superposing and separating unit to the interference separator, and introducing one of the signal lights outputted from the optical path superposing and separating unit to the interference separator; and a fourth optical waveguide for connecting the optical path superposing and separating unit to the interference separator, and introducing the other signal light outputted from the optical path superposing and separating unit to the interference separator, the fourth optical waveguide having a shorter optical path length than the third optical waveguide, the optical path length of the fourth optical waveguide being set such that a delay time of the signal light propagating through the second optical waveguide relative to the signal light propagating through the first optical waveguide is canceled at time when the two signal lights reach the interference separator.

2. An optical signal processing device according to claim 1, wherein the control-light introducing optical system includes a control-light inputting waveguide merging with one of the first optical waveguide and the second optical waveguide.

3. An optical signal processing device according to claim 1, wherein a first phase adjuster for delaying a light propagating therethrough and adjusting a delay amount in accordance with an externally applied control signal is inserted in at least one of the first optical waveguide and the second optical waveguide.

4. An optical signal processing device according to claim 1, wherein a first phase adjuster for delaying a light propagating therethrough and adjusting a delay amount in accordance with an externally applied control signal is inserted in at least one of the third optical waveguide and the fourth optical waveguide.

5. An optical signal processing device according to claim 1, wherein the optical path superposing and separating unit includes a semiconductor optical amplifier having a plane waveguide, and optical paths of the two signal lights inputted to the semiconductor optical amplifier are selected such that the two optical paths cross each other in the plane waveguide in an orthogonal relation.

6. An optical signal processing device according to claim 1, wherein the optical path superposing and separating unit includes a 2-input and 2-output multimode interferometer for outputting the signal light applied through one input point thereof from one output point thereof and outputting the signal light applied through the other input point thereof from the other output point thereof, and the two signal lights applied through the two input points are superposed with each other in the multimode interferometer, the multimode interferometer including a non-linear waveguide arranged in an area where the two signal lights are superposed with each other.

7. An optical signal processing device according to claim 1, wherein the optical path superposing and separating unit comprises:

a first multimode interferometer having at least two input points and at least two output points;

a second multimode interferometer having input points corresponding to the output points of the first multimode interferometer, and at least two output points;

a plurality of waveguides for connecting the output points of the first multimode interferometer to the corresponding input points of the second multimode interferometer, at least one of the plurality of waveguides being a non-linear waveguide, wherein the signal light applied through one of the input points of the first multimode interferometer passes the plurality of waveguides and exits from one of the output points of the second multimode interferometer, and the signal light applied through another input point of the first multimode interferometer passes the plurality of waveguides and exits from another output point of the second multimode interferometer.

8. An optical signal processing device according to claim 1, wherein the non-linear waveguide is constituted by a semiconductor optical amplifier.

9. An optical signal processing device according to claim 1, further comprising a branching multimode interferometer for outputting the signal light applied through an input point thereof from two output points thereof with intensities almost equal to each other, the branching multimode interferometer having one of the output points connected to the input end of the first optical waveguide and the other output point connected to the input end of the second optical waveguide.

10. An optical signal processing device according to claim 1, wherein the control-light introducing optical system includes a combining multimode interferometer inserted midway one of the first optical waveguide and the second optical waveguide, the combining multimode interferometer having at least two input points and one output point, one of the input points and the output point being both connected to the one optical waveguide, the combining multimode interferometer receiving the control light applied through the other input point thereof and outputting both the signal light applied through the one input point thereof and the control light applied through the other input point thereof from the output point thereof.

11. An optical signal processing device according to claim 1, wherein the interference separator includes a 2-input and 2-output separation multimode interferometer having one input point connected to the third optical waveguide and the other input point connected to the fourth optical waveguide, the separation multimode interferometer outputting the signal light from one output point thereof when the signal lights applied through the two input points have the same phase, and outputting the signal light from the other output point when the signal lights applied through the two input points have opposite phases.

12. A wavelength converting device comprising:

an optical path superposing and separating unit for receiving two continuous lights having a first wavelength, superposing once optical paths of the two inputted continuous lights with each other, and then separating the two signal lights to be outputted separately, the optical path superposing and separating unit including a non-linear waveguide arranged in an area where both the optical paths are superposed with each other, the non-linear waveguide having a refractive index non-linearly changed upon a control light pulse having a second wavelength being introduced;

a first optical waveguide having a continuous light input end and an output end connected to the optical path superposing and separating unit, the first optical waveguide introducing the continuous light to the optical path superposing and separating unit;

a second optical waveguide having a continuous light input end and an output end connected to the optical path superposing and separating unit, the second optical waveguide introducing the continuous light to the optical path superposing and separating unit;

a control-light introducing optical system for introducing a control light pulse to the non-linear waveguide;

an interference separator for receiving the two continuous lights and outputting the light having the first wavelength only during a period in which a phase difference between the inputted two continuous lights satisfies a certain condition;

a third optical waveguide for connecting the optical path superposing and separating unit to the interference separator, and introducing one of the continuous lights outputted from the optical path superposing and separating unit to the interference separator; and a fourth optical waveguide for connecting the optical path superposing and separating unit to the interference separator, and introducing the other continuous light outputted from the optical path superposing and separating unit to the interference separator, the fourth optical waveguide having a shorter optical path length than the third optical waveguide.

13. A wavelength converting device according to claim 12, wherein the control-light introducing optical system includes a control-light inputting waveguide merging with one of the first optical waveguide and the second optical waveguide.

14. A wavelength converting device according to claim 12, wherein the optical path superposing and separating unit includes a semiconductor optical amplifier having a plane waveguide, and optical paths of the two signal lights inputted to the semiconductor optical amplifier are selected such that the two optical paths cross each other in the plane waveguide in an orthogonal relation.

15. A wavelength converting device according to claim 12, wherein the optical path superposing and separating unit includes a 2-input and 2-output multimode interferometer for outputting the continuous light applied through one input point thereof from one output point thereof and outputting the continuous light applied through the other input point thereof from the other output point thereof, and the two continuous lights applied through the two input points are superposed with each other in the multimode interferometer, the multimode interferometer including a non-linear waveguide arranged in an area where the two continuous lights are superposed with each other.

16. A wavelength converting device according to claim 12, wherein the optical path superposing and separating unit comprises:

a first multimode interferometer having at least two input points and at least two output points;

a second multimode interferometer having input points corresponding to the output points of the first multimode interferometer, and at least two output points;

a plurality of waveguides for connecting the output points of the first multimode interferometer to the corresponding input points of the second multimode interferometer, at least one of the plurality of waveguides being a non-linear waveguide, wherein the continuous light applied through one of the input points of the first multimode interferometer passes the plurality of waveguides and exits from one of the output points of the second multimode interferometer, and the continuous light applied through another input point of the first multimode interferometer passes the plurality of waveguides and exits from another output point of the second multimode interferometer.

17. A wavelength converting device according to claim 16, wherein the non-linear waveguide is constituted by a semiconductor optical amplifier.

18. A wavelength converting device according to claim 12, further comprising a branching multimode interferometer for outputting the continuous light applied through an input point thereof from two output points thereof with intensities almost equal to each other, the branching multimode interferometer having one of the output points connected to the input end of the first optical waveguide and the other output point connected to the input end of the second optical waveguide.

19. A wavelength converting device according to claim 12, wherein the control-light introducing optical system includes a combining multimode interferometer inserted midway one of the first optical waveguide and the second optical waveguide, the combining multimode interferometer having at least two input points and one output point, one of the input points and the output point being both connected to the one optical waveguide, the combining multimode interferometer receiving the control light applied through the other input point thereof and outputting both the signal light applied through the one input point thereof and the control light applied through the other input point thereof from the output point thereof.

20. A wavelength converting device according to claim 12, wherein the interference separator includes an at least 2-input and 1-output separation multimode interferometer having one input point connected to the third optical waveguide and another input point connected to the fourth optical waveguide, the separation multimode interferometer outputting the signal light from the output point thereof when the signal lights applied through the two input points have opposite phases.

21. An optical demultiplexer comprising:

a plurality of drop devices, each of the drop devices having a control light input port to which a control light is applied, a signal light input port to which a signal light is applied, and a drop signal output port;

a signal waveguide for branching a time-division multiplexed signal light and applying a plurality of branched signal lights respectively to the signal light input ports of the drop devices; and a control waveguide for branching one control light and applying a plurality of branched control lights to reach the corresponding drop devices at delays gradually shifted in units of a certain time, each of the drop devices comprising:

a branching optical element for branching the signal light applied through the signal light input port;

an optical path superposing and separating unit for receiving two signal lights, superposing once optical paths of the two inputted signal lights with each other, and then separating the two signal lights to be outputted separately, the optical path superposing and separating unit including a non-linear waveguide arranged in an area where both the optical paths are superposed with each other, the non-linear waveguide having a refractive index changed depending on externally applied excitation;

a first optical waveguide having a signal light input end, through which one of signal lights branched by the branching optical element is inputted, and an output end connected to the optical path superposing and separating unit;

a second optical waveguide having a signal light input end, through which the other signal light branched by the branching optical element is inputted, and an output end connected to the optical path superposing and separating unit, the second optical waveguide having an optical path length from the input end thereof to the optical path superposing and separating unit, which is longer than an optical path length of the first optical waveguide from the input end thereof to the optical path superposing and separating unit;

a control-light introducing optical system for introducing a control light, which is applied through the control light input port, to the non-linear waveguide;

an interference separator for receiving the two signal lights and outputting the signal light from the drop signal output port only when a phase difference between the inputted two signal lights satisfies a certain specific condition;

a third optical waveguide for connecting the optical path superposing and separating unit to the interference separator, and introducing one of the signal lights outputted from the optical path superposing and separating unit to the interference separator; and a fourth optical waveguide for connecting the optical path superposing and separating unit to the interference separator, and introducing the other signal light outputted from the optical path superposing and separating unit to the interference separator, the fourth optical waveguide having a shorter optical path length than the third optical waveguide, the optical path length of the fourth optical waveguide being set such that a delay time of the signal light propagating through the second optical waveguide relative to the signal light propagating through the first optical waveguide is canceled at time when the two signal lights reach the interference separator.

22. An optical demultiplexer comprising:

a number N (N is two or larger integer) of drop devices, each of the drop devices having a control light input port to which a control light is applied, a signal light input port to which a signal light is applied, and a drop signal output port;

a signal waveguide for applying a signal light, which is time-division multiplexed at multiplicity of N and has a number N of channels, to the signal light input port of each of the drop devices; and a control waveguide for branching one control light into a number N of control lights and applying an i-th (i is an integer not smaller than 1 but not larger than N) one of the branched control lights to the control light input port of an i-th drop device, the signal waveguide and the control waveguide delaying one of the control light and the signal light relative to the other such that the control light applied to the i-th drop device is in sync with an i-th channel of the signal light applied to the i-th drop device, each of the drop devices comprising:

a branching optical element for branching the signal light applied through the signal light input port;

an optical path superposing and separating unit for receiving two signal lights, superposing once optical paths of the two inputted signal lights with each other, and then separating the two signal lights to be outputted separately, the optical path superposing and separating unit including a non-linear waveguide arranged in an area where both the optical paths are superposed with each other, the non-linear waveguide having a refractive index changed depending on externally applied excitation;

a first optical waveguide having a signal light input end, through which one of signal lights branched by the branching optical element is inputted, and an output end connected to the optical path superposing and separating unit;

a second optical waveguide having a signal light input end, through which the other signal light branched by the branching optical element is inputted, and an output end connected to the optical path superposing and separating unit, the second optical waveguide having an optical path length from the input end thereof to the optical path superposing and separating unit, which is longer than an optical path length of the first optical waveguide from the input end thereof to the optical path superposing and separating unit;

a control-light introducing optical system for introducing a control light, which is applied through the control light input port, to the non-linear waveguide;

an interference separator for receiving the two signal lights and outputting the signal light from the drop signal output port only when a phase difference between the inputted two signal lights satisfies a certain specific condition;

a third optical waveguide for connecting the optical path superposing and separating unit to the interference separator, and introducing one of the signal lights outputted from the optical path superposing and separating unit to the interference separator; and a fourth optical waveguide for connecting the optical path superposing and separating unit to the interference separator, and introducing the other signal light outputted from the optical path superposing and separating unit to the interference separator, the fourth optical waveguide having a shorter optical path length than the third optical waveguide, the optical path length of the fourth optical waveguide being set such that a delay time of the signal light propagating through the second optical waveguide relative to the signal light propagating through the first optical waveguide is canceled at time when the two signal lights reach the interference separator.

23. An optical demultiplexer comprising:

a number N (N is two or larger integer) of drop devices arranged from a first stage to an N-th stage, each of the drop devices having a control light input port to which a control light is applied, a signal light input port to which a signal light is applied, a drop signal output port from which the signal light is delivered in sync with inputting of the control light, and a through signal output port from which the signal light is delivered at least during a period in which the signal light is not delivered from the drop signal output port;

a first signal waveguide for applying a time-division multiplexed signal light to the signal light input port of the first-stage drop device;

a second signal waveguide for connecting the through signal output port of each drop device to the signal light input port of the drop device in a next stage; and a control waveguide for branching one control light and applying a plurality of branched control lights to reach the corresponding drop devices at delays gradually shifted in units of a certain time toward a most downstream stage, each of the drop devices comprising:

a branching optical element for branching the signal light applied through the signal light input port;

an optical path superposing and separating unit for receiving two signal lights, superposing once optical paths of the two inputted signal lights with each other, and then separating the two signal lights to be outputted separately, the optical path superposing and separating unit including a non-linear waveguide arranged in an area where both the optical paths are superposed with each other, the non-linear waveguide having a refractive index changed depending on externally applied excitation;

a first optical waveguide having a signal light input end, through which one of signal lights branched by the branching optical element is inputted, and an output end connected to the optical path superposing and separating unit;

a second optical waveguide having a signal light input end, through which the other signal light branched by the branching optical element is inputted, and an output end connected to the optical path superposing and separating unit, the second optical waveguide having an optical path length from the input end thereof to the optical path superposing and separating unit, which is longer than an optical path length of the first optical waveguide from the input end thereof to the optical path superposing and separating unit;

a control-light introducing optical system for introducing a control light, which is applied through the control light input port, to the non-linear waveguide;

an interference separator for receiving the two signal lights, outputting the signal light from the drop signal output port when a phase difference between the inputted two signal lights satisfies a certain specific condition, and outputting the signal light from the through signal output port when the phase difference between the inputted two signal lights satisfies the certain specific condition;

a third optical waveguide for connecting the optical path superposing and separating unit to the interference separator, and introducing one of the signal lights outputted from the optical path superposing and separating unit to the interference separator; and a fourth optical waveguide for connecting the optical path superposing and separating unit to the interference separator, and introducing the other signal light outputted from the optical path superposing and separating unit to the interference separator, the fourth optical waveguide having a shorter optical path length than the third optical waveguide, the optical path length of the fourth optical waveguide being set such that a delay time of the signal light propagating through the second optical waveguide relative to the signal light propagating through the first optical waveguide is canceled at time when the two signal lights reach the interference separator.

24. An optical demultiplexer according to claim 23, wherein the signal light is a signal having a number N of time-division multiplexed channels, and wherein the control waveguide delays the control light inputted to an i-th (i is an integer not smaller than 1 but not larger than N) drop device to be in sync with an i-th channel of the signal light inputted to the i-th drop device.

25. An optical demultiplexer according to claim 21, further comprising a transducer for converting the signal light delivered from the drop signal output port of each of the drop devices into an electrical signal.

26. An optical demultiplexer according to claim 22, further comprising a transducer for converting the signal light delivered from the drop signal output port of each of the drop devices into an electrical signal.

27. An optical demultiplexer according to claim 23, further comprising a transducer for converting the signal light delivered from the drop signal output port of each of the drop devices into an electrical signal.

28. An optical signal processing method comprising the steps of:

branching a time-division multiplexed optical signal having a plurality of channels into a first optical signal and a second optical signal;

introducing the first optical signal and the second optical signal to a non-linear waveguide such that the second optical signal is delayed a time corresponding to one channel from the first optical signal;

changing a refractive index of the non-linear waveguide at first time, thereby changing phase of the optical signal in each channel passing the non-linear waveguide after the first time;

introducing the first optical signal and the second optical signal, which are both outputted from the non-linear waveguide, to an interference separator such that the first optical signal is delayed a time corresponding to one channel from the second optical signal; and separating the optical signal in the channel, in which the first optical signal and the second optical signal are out of phase, among the corresponding channels of the first optical signal and the second optical signal.

29. A wavelength converting method comprising the steps of:

branching a continuous light having a first wavelength into a first continuous light and a second continuous light;

introducing the first continuous light and the second continuous light to a non-linear waveguide;

changing a refractive index of the non-linear waveguide at a first time by introducing, to the non-linear waveguide, a control light pulse having a second wavelength different from the first wavelength, thereby changing phases of the first continuous light and the second continuous light both passing the non-linear waveguide after the first time;

introducing the first continuous light and the second continuous light, which are both outputted from the non-linear waveguide, to an interference separator such that the first continuous light is delayed a first delay time from the second continuous light; and outputting an optical signal having the first wavelength only during a period in which the first continuous light and the second continuous light are out of phase.

* * * * *